much ID: US 7,624,637 B2

(12) United States Patent
Kurtz et al.

(10) Patent No.: US 7,624,637 B2
(45) Date of Patent: Dec. 1, 2009

(54) BEAM ACCELEROMETER WITH LIMITING APPARATUS

(75) Inventors: Anthony D. Kurtz, Saddle River, NJ (US); Scott Goodman, Wayne, NJ (US); Adam Kane, Morristown, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 105 days.

(21) Appl. No.: 11/901,021

(22) Filed: Sep. 14, 2007

(65) Prior Publication Data

US 2009/0071250 A1    Mar. 19, 2009

(51) Int. Cl.
G01P 15/10     (2006.01)
G01P 15/12     (2006.01)

(52) U.S. Cl. .................. 73/514.29; 73/514.33
(58) Field of Classification Search ............. 73/514.33, 73/514.29, 514.34, 514.16, 862.621, 862.638
See application file for complete search history.

(56) References Cited

U.S. PATENT DOCUMENTS

| | | | | | |
|---|---|---|---|---|---|
| 2,907,560 | A | * | 10/1959 | Stedman | .................. 73/514.12 |
| 3,281,768 | A | * | 10/1966 | Pavey, Jr. et al. | .............. 367/21 |
| 3,629,773 | A | * | 12/1971 | Shoor | ........................... 338/43 |
| 3,995,247 | A | | 11/1976 | Kurtz | |
| 4,619,147 | A | * | 10/1986 | Yoshimura et al. | ..... 73/862.381 |
| 4,789,762 | A | * | 12/1988 | Miller et al. | .......... 200/61.45 R |
| 5,440,077 | A | * | 8/1995 | Konishi et al. | ............... 177/185 |
| 5,685,884 | A | * | 11/1997 | Van Den Berg | ................ 29/595 |
| 5,801,348 | A | * | 9/1998 | Asada | ..................... 200/61.53 |
| 6,374,673 | B1 | * | 4/2002 | Schendel | ................. 73/514.08 |
| 7,086,299 | B2 | * | 8/2006 | Kurtz et al. | ............ 73/862.638 |
| 7,275,452 | B2 | * | 10/2007 | Kurtz et al. | ............ 73/862.391 |

* cited by examiner

Primary Examiner—Helen C. Kwok
(74) Attorney, Agent, or Firm—Troutman Sanders LLP; James E. Schutz

(57) ABSTRACT

An accelerometer includes a cantilever mass with a thin beam element between the mass and the fixed end of the accelerometer. The end of the mass is tapered. A limiting member has an aperture that is tapered corresponding to the taper at the end of the mass and positioned to surround the tapered end of the seismic mass. The beam accelerometer as well as the limiting member is placed in a cylindrical housing whereby the limiting member is moved along the taper of the seismic mass to adjust the spacing between the limiting member and the inner wall of the housing to thereby adjust the amount of movement of the seismic mass. In one embodiment the aperture of the tapered limited member also surrounds the seismic mass but the gap between the inner wall of the tapered limiting member and the outer wall of the seismic mass is adjusted to determine the amount of movement of the beam. In this manner, one can utilize a beam accelerometer arrangement of a cylindrical configuration within a housing and whereby the seismic mass has a taper and the taper coacts with a limiting member which has a corresponding taper to adjust the distance that the beam can move upon application of a force thereto.

20 Claims, 2 Drawing Sheets

BEAM ACCELEROMETER WITH LIMITING APPARATUS

FIELD OF THE INVENTION

This invention relates to accelerometers and more particularly to a cylindrical beam accelerometer incorporating a variable clearance limit device.

BACKGROUND OF THE INVENTION

Many different types of accelerometers exist in the prior art. These devices typically measure acceleration by performing measurements on a mass which is coupled to a spring assembly or some other device. This spring assembly or other device, such as a beam will, due to its resiliency or movement compress with stress by movement of the mass. Strain gauges placed on the spring or beam will respond to the compression or stretching and produce an output voltage proportional to the same. The piezoresistive strain gauge has been utilized in such accelerometers with great success and also has been employed for measuring strain in various other transducer configurations. It is known that the piezoresistor is traditionally more sensitive than for example other types of gauges, such as metal wire or foil type strain gauges. Generally the performance of an accelerometer is determined by two quantities: 1) the output as a function of acceleration and, 2) the natural frequency of operation. It is desirable to maximize both quantities in any given design, but because the greater the mass of the seismic structure the greater the output per acceleration (g) but the lower the natural frequency.

In order to eliminate the effective mass, one frequently refers to a quantity designated as the figure of merit (FOM) of the accelerometer system. The figure of merit (FOM) is the product of the output per g times the natural frequency squared ($g \times f^2$). Since the output per "g" (acceleration) is directly proportional to the mass and the natural frequency is proportional to the square root of the system stiffness divided by the mass, the FOM will be independent of the mass. Due to the increasing demands of present technology, it is desirable to fabricate an accelerometer with high figures of merit, excellent thermal characteristics and enhanced ruggedness. It is further desirable to employ an accelerometer having improved frequency response to enable one to measure relatively high frequency, small magnitude accelerations. Thus, the high FOM and very small displacement are apparent in the shimmed beam of prior art devices. To design a mechanical stop for a rectangular mass/beam accelerometer is very difficult. With typical displacements on the order of 0.0001 inch and standard manufacturing tolerances of 0.005 inch, each transducer thus would require a custom adjusted stop mechanism. A stop mechanism is a mechanism or apparatus which limits the movement of the spring or beam in multiple directions. In this manner, the movement is limited to avoid fracturing or breakage of the beam for large magnitude acceleration or forces which would otherwise bend a thin beam beyond its mechanical limits.

Stop mechanisms exist for various transducer devices as well as for beams. These mechanisms serve to limit the displacement of the device in various directions and operate to limit movement of device to avoid breakage of the device for large forces. In most piezoresistive based accelerometers, the deflecting member is either a cantilever beam to which a seismic mass is attached, or a specially fabricated seismic mass, which in itself contains the requisite beams. Both methods have their own advantages and disadvantages. In the cantilever beam approach, a narrow section of the beam contains piezoresistive strain gauges on the top and bottom of the beam. One end of the beam is clamped to obtain a cantilever action and a seismic mass is mounted to the other end or free end of the beam. Under applied acceleration, the beam deflects, giving rise to an output from the piezoresistive bridge. In the prior art, the narrow portion of the beam could be spanned by very short sensors positioned on shims, above or below the beam. In the former case, the stiffness of the beam is determined only by the dimensions of the beam, but when the narrow portion of the beam is spanned by the short sensors on shims, they also help determine the overall stiffness and give rise to a higher FOM for the accelerometer structure. In the former case, with the larger deflection, it is possible by careful control of the beam's dimensions, to install stops to limit deflections at higher accelerations. In the latter, with the beam spanned by sensors on shims the stiffness is increased resulting in a much smaller deflection. Thus, designing stops for the much smaller deflections at high accelerations is an extremely challenging and difficult task. This results in excessive cost to such devices operating as indicated above.

Alternative techniques and devices for transducers including accelerometers adapted with a stop which further provides a higher FOM and an improved operation is desired.

SUMMARY OF THE INVENTION

In an exemplary embodiment, an apparatus for limiting the movement of an accelerometer, comprising: an accelerometer structure having a base and a seismic mass with a relatively thin beam positioned between the mass and the base, the mass having a tapered end about the end surface which end surface is furthest remote from the beam, a movement limit member having a tapered aperture positioned to surround the tapered end of the tapered mass and means coupled to the limit member to move the same with respect to the mass, to determine the limit of movement of the mass and therefore the beam during accelerometer operation.

A method for limiting the movement of an accelerometer having a cylindrical base and a cylindrical mass with a beam of a rectangular cross-section coupled between the mass and base, and a cylindrical housing enclosing the mass and beam and coupled to the base at one end and closed at the other end, comprising the steps of: placing a taper about the top end surface of the mass, the surface furthest remote from the beam; surrounding the taper with a moveable member having an aperture with a corresponding taper to the mass taper; and moving the moveable member to change the spacing between the mass and the housing to thereby limit the movement of the mass during accelerometer operation.

BRIEF DESCRIPTION OF THE FIGURES

FIG. 5 consists of FIG. 5A and FIG. 5B; FIG. 5A is a cross-sectional view of an accelerometer as depicted in FIG. 1 showing exemplary dimensions of an accelerometer, while

DETAILED DESCRIPTION OF THE INVENTION

Figure 1:
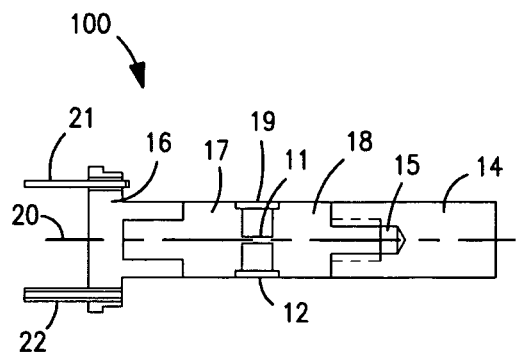
FIG. 1 is a beam/seismic mass accelerometer having a central beam and outboard shims for strain output optimization and useful in conjunction with the present invention.

Referring to FIG. 1 there is shown an accelerometer 100. Essentially, the accelerometer has a base section 16. The base section 16 has positioned thereon a first portion 17 of a beam type accelerometer. The accelerometer has a center beam section 11 which is extremely thin and narrow and the center beam portion would contain a piezoresistive bridge or other sensor arrangement positioned thereon. The piezoresistive sensors can be positioned so that two are parallel to the central axis 20 of the accelerometer while two piezoresistors are transverse. The piezoresistors are then wired in a Wheatstone bridge configuration. The beam is positioned between sections 17 and 18. Section 18 has a threaded member 15 which threaded member engages a seismic mass 14. In order to provide stability to the structure, there is shown outboard shims 12 and 19 which are positioned between members 17 and 18 and provide extra rigidity to the entire structure. Basically the beam/seismic mass accelerometer depicted in FIG. 1 includes a relatively small center beam with the outboard shims as 12 and 19 for providing strain output optimization.

The device depicted in FIG. 1 does not include a stop mechanism. Also it is noted that the entire structure depicted in FIG. 1 is cylindrical in cross-section. The base 16 as well as the accelerometer configuration is coupled to a hollow cylindrical can or housing which operates to cover or enclose the structure. As seen the base also has multiple pins as 21 and 22, which pins accommodate the terminals of the Wheatstone bridge and are utilized for providing an output as well as a biasing voltage to the Wheatstone bridge. The pins are shown as two in nature but of course there can be more to accommodate the various terminals. In any event, as one can see, the shims 12 and 19 provide extra support for the center beam 11, but if the beam deflects beyond a predetermined limit, the center beam could break or rupture as there is no stop. Therefore, one would try to dimension the cylindrical housing member to have the inner wall to impinge upon the seismic mass during a predetermined amount of acceleration.

Accelerometers are typically designed for a range of measurement, with limited acceleration to prevent damage to the device. An example is an accelerometer designed to measure 30 g's full scale, but having an overlimit protection feature of up to 1000 g's. In the event of an input over 30 g's, the accelerometer would not be damaged and will still perform within specification. The limit is similar to the mechanical limit or stop design in a silicon sensing die, for overpressure, where the die would not be damaged.

As one can ascertain, accelerometers are designed to very small sizes, to accommodate space constraints and mounting of the device under test. Also the accelerometer is very small to achieve a high resonant frequency, such that error is not introduced into the measurement. A high resonant frequency requires lightweight, and stiff elements. For a beam accelerometer, which has a very small cantilever beam with a seismic mass on the end, the displacements are very small, and are on the order of 40 micro-inches. The displacement of such an accelerometer, even at an overlimit event, such as 1000 g's is on the order of 0.001 inch. The stop is provided by the housing of the accelerometer which would have the 0.001 inch gap between the seismic mass and the inside wall of the housing. These dimensions are very small, and require very high tolerances on the machined parts and assembly process. Typical machined part tolerances are on the order of 0.005 inches, and the assembly process introduces all types of variations as well. Thus, to provide a stop for a device shown in FIG. 1 would be extremely difficult as indicated above.

Figure 2:
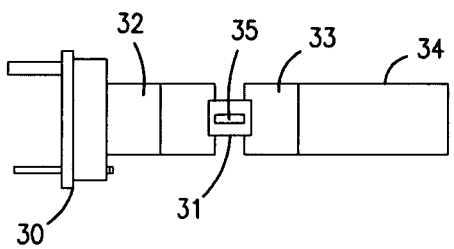
FIG. 2 shows an alternate accelerometer configuration having a gauged shim with a seismic mass.

Referring to FIG. 2 there is shown a second accelerometer configuration. The accelerometer of FIG. 2 has a base 30 with a first section 32 and a back section 33. Back section 33 is attached to a seismic mass 34. Spanning sections 32 and 33 is a shim 31. The shim 31 as seen, spans sections 32 and 33 and contains a piezoresistive bridge configuration or shim section. The difference between the structures shown in FIG. 1 and FIG. 2 is that the center shim 31 is more substantial than the center beam 11 of the configuration of FIG. 1 and hence the outboard shims 12 and 19 are eliminated in the structure shown in FIG. 2. However, the same problems exist for both structures, namely, that the structures are extremely small and require a stop mechanism in order to prevent excessive bending and therefore a rupture or breakage of the central beam or shim section during device operation. As seen in FIG. 2 the beam also has a central elongated aperture 35 and would have gauges positioned on the surface thereof and located adjacent to the central opening 35.

Figure 3:
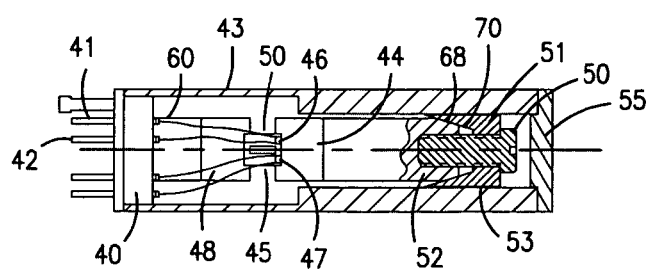
FIG. 3 shows an accelerometer having a limiting mechanism according to this invention.

Referring to FIG. 3 there is shown an embodiment of the present invention which shows an accelerometer positioned in the housing having a motion limiting or stop device. As seen in FIG. 3 the accelerometer conventionally has a base 40 which is analogous to the base 30 and base 16 of FIGS. 1 and 2. The base 40 contains pins as 41 and 42 which are coupled to terminals such as 60. The accelerometer has a front portion 48 and a back portion 44. The front and back portions are spanned by a central shim 50 having a central aperture. The shim contains, as one can see, two piezoresistors 46 on the top of the shim and two piezoresistors 47 at the bottom of the shim.

The piezoresistors are directed to terminals as 60 and therefore are associated with separate pins so that the piezoresistors can be wired into a bridge configuration such as a Wheatstone bridge and also receive biasing for operation. Essentially, section 44 of the accelerometer is coupled to the seismic mass 52. The seismic mass 52, as one can see, is machined with an end taper 68. The taper 68 about the end surface of the seismic mass 52 coacts with an external mating taper 70 formed on a limit stop member 51. The limit stop member as can be seen, has a conical aperture which basically surrounds the taper 68 on the seismic mass 52. The limiting member 51 has a bolt aperture as does the seismic mass. An adjustment bolt or screw 50 is inserted through the bolt aperture, in limiting device 51 and into the corresponding aperture of the seismic device 52. In this manner, as the adjustment bolt 50 is moved, the spacing between the inner wall of the housing 43 and between the upper wall of the limiting device 51 is adjusted.

Figure 4:
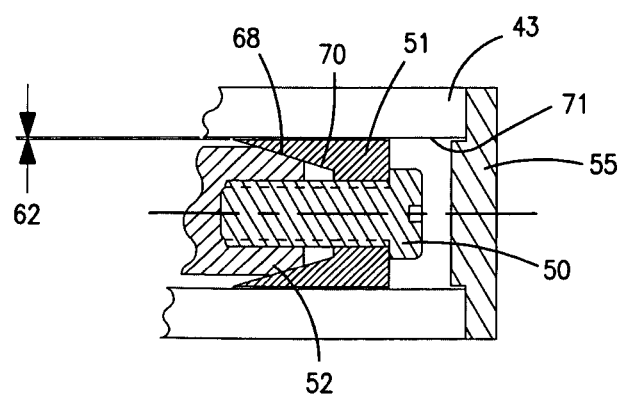
FIG. 4 is an enlarged view of the limiting mechanism operative in conjunction with a shimmed accelerometer.

Referring to FIG. 4 the limiting or stop mechanism depicted in FIG. 3 is shown in greater detail. Same reference numerals as in FIG. 3, have been utilized so one can easily understand operation. The housing 43 has the inner wall 71 surrounding the limit adjustment member 51. The limit adjustment member has an internal conical aperture where the internal surface 70 of the aperture of the limiting device 51 coacts with the taper 68 about the end surface of the seismic mass 52. As seen the adjustment screw 50 is directed through the limiting device 51 and into the aperture of the seismic mass. Thus, as the adjustment screw 50 is rotated either in a clockwise or counter clockwise direction the spacing between the inner wall of the cylindrical housing 43 and the top wall of the adjustment device 51 is varied. This spacing is referred to as 62. The variations can occur in very small intervals determined only by the pitch of the thread of the adjustment bolt or mechanism 50. Thus, the conical aperture wall of the limiting device 51 rides upon the taper 68 of the seismic mass 52 and as the bolt 50 is rotated the device 51 moves away from or closer to the inner wall of the cylindrical housing 43 varying the stop dimension 62.

As indicated above, the entire structure shown in FIG. 3 is a cylindrical structure, thus the housing 43 is cylindrical while the taper on the seismic mass 52 is conical with the inner aperture of the limiting device 51 also being conical to accommodate the conical taper. In an exemplary configuration, the seismic mass 52 is machined with the end taper 68 and the bolt aperture at the free end of the mass. Mated to the taper 68 is the cylindrical limiting member 51 with the matching internal conical taper. The member 51 preferably is made of a relatively soft material as compared to the material of the seismic mass. Thus, this material can be a softer metal. For example, if the seismic mass were made of steel as 52 the member 51 could be made out of a plastic or an elastomeric material or a softer metallic material. Thus, the material utilized to fabricate the limiting member 51 would deform under an applied load via bolt 50.

The adjustable bolt 50 provides the load and therefore as the adjustment screw is rotated the member 51 moves and slightly deforms to the taper of the seismic mass. After assembly of the accelerometer, and when the accelerometer is placed in the housing, the cover 55 of the cylindrical housing 43 allows access to the bolt 50. The bolt is then turned which deforms the limiting device until the desired gap 62 is achieved between the limit device and the interior surface of the housing wall. In this manner, each accelerometer regardless of machine and fabrication tolerances will provide the desired overlimit stop, by adjustment of the limit device 51, via the bolt 50.

The limit device can achieve a gap of 0.001 inch even with standard machining tolerances of 0.005 inches and subsequent assembly process. As one can ascertain, the cantilever beam/mass design depicted above provides a stop for the shimmed beam. See U.S. Pat. No. 3,995,247 ('247 patent), entitled "Transducers Employing Gap-Bridging Shim Members" by A. D. Kurtz, issued on Nov. 30, 1976 and assigned to the assignee herein. In that patent, the accelerometer uses a cube/beam design with minimal displacement. To increase the output for low acceleration measurements, the deflection is increased with the cantilever design as compared to the cube design in the above-noted patent. The increased displacement for low acceleration requires mechanical stops to limit the displacement in exposure to overlimit conditions that may damage the low acceleration measurement and accuracy of the accelerometer.

The addition of the center shim increases the stiffness of the beam reducing the displacement to some extent while serving to increase the output of the strain gauges. This design is also easier to add damping as it can be enclosed within a hermetic housing such as housing 43 and cover member 55. In this manner, damping can be achieved by filling the enclosed volume with a fluid such as an oil or a similar fluid. The oil as one can ascertain from the prior art can be a silicon oil or other similar fluid. The cube design as indicated in the above-noted '247 patent is very stiff, which makes it an excellent design for high g applications. The beam design disclosed herein has higher displacement and output making it a better choice for low acceleration measurements. The bending beam design has the best features of the high acceleration cube with shims, with the added features of controlled damping and overlimit mechanical stops to protect the device.

In summary, the adjustable limit device allows the accelerometer to maintain accurate measurements even with over-limit exposures. The device achieves very tight limit gaps on the order of 0.001 inch with standard machined parts. The tolerances of 0.005 inch and standard assembly practice are employed by using the limit device which is adjusted after each accelerometer assembly. Thus, the transducer depicted is a beam design having a shim having transducers located thereon and having seismic mass with a taper about the end surface which taper coacts with a limiting assembly having a tapered inner aperture to coact with the tapered surface of the seismic mass and to thereby provide a controllable stop mechanism for the entire device enabling improved operation. It is noted that the taper mechanism can be utilized with both the accelerometer configurations depicted in FIGS. 1 and 2.

Figure 5B:
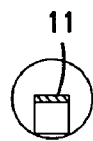
FIG. 5B shows a cross-sectional view of the accelerometer taken through line B-B of FIG. 5A.
Figure 5A:
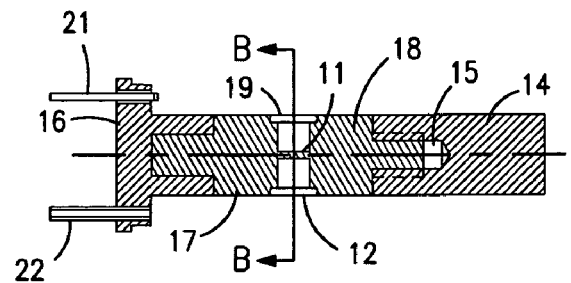

Referring to FIG. 5 which consists of FIGS. 5A and 5B there is shown an accelerometer as the one depicted in FIG. 1 showing typical dimensions. Thus, one can see that the device is very small with the length of the device from the bottom surface of the base to the top surface of the seismic mass being 1.36 inches. The width of the central beam is 0.02 inches. As one can see from FIG. 5B the device as shown through cross-section BB is essentially cylindrical. FIG. 5A shows the device with typical dimensions (see FIG. 1) but does not show the tapered mechanism. As indicated FIG. 5 which consists of 5A and 5B shows the accelerometer of FIG. 1 to show typical dimensions of the accelerometer and to show that it is cylindrical in shape. It of course does not show the covered member.

Figure 6:
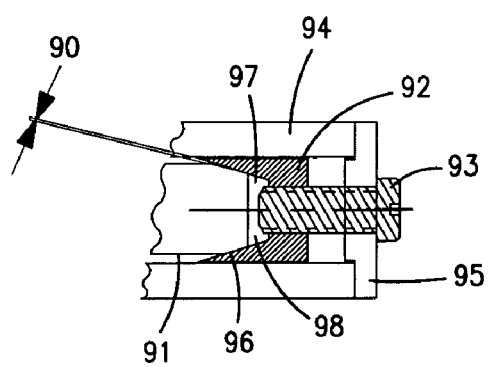
FIG. 6 depicts an alternate embodiment of a stop mechanism for a shimmed accelerometer according to the principles of this invention.

Referring to FIG. 6 there is shown an alternate embodiment of a limiting device where the adjustment device is part of the housing cover and therefore the clearance gap indicated by reference numeral 90 is between the taper of the seismic mass 91 and the taper of the internal aperture of the limiting device 92. As seen in FIG. 6, again in cross-section, the housing 94 which is a cylindrical housing, containing the accelerometer is shown in a partial view. The seismic mass 91 of this accelerometer again has a tapered outer peripheral surface 96 which mates with a corresponding taper 97 located on the inner surface of aperture 98 of the limiting device 92. The cylindrical housing 94 has a top cover member 95 which contains an aperture for the adjustment screw 93 which extends through the cover member 95 and which adjustment screw only enters the aperture of the limiting device 92 and unlike the configuration shown in FIG. 4 does not in any manner interface with the seismic mass 91. A bolt 93 is rotated the limiting member 92 is moved to change the taper or spacing between the seismic mass 91 and the limiting device 92 as depicted by reference numeral 90. This changes the clearance between these two members and hence, changes the amount or distance the beam will be allowed to deflect as again limiting the movement of the seismic mass 91. It is seen both in FIG. 6 and FIG. 4 that the distance that the seismic mass can move and therefore the distance that the associated shim or central beam member can move is determined by the clearance gap 62 in FIG. 4 or the clearance gap 90 in FIG. 6.

It is of course understood as indicated above that in regard to prior art accelerometers the beam/mass assembly of the prior art can take the form of a cylinder or cube or other suitable shape. These accelerometers will have a large displacement with acceleration. The mechanical design of these accelerometers allow for mechanical stops to protect the device in the event of overloading. The thin beam will have a very low stiffness which in turn will yield a low FOM. In any event, the narrow portion of the beam is spanned by very short sensors on shims above or below the beam as shown in FIGS. 1 and 2.

In the former case the stiffness of the beam is determined only by the dimensions of the beam but when the narrow portion of the beam is spanned by the short sensors on shims they also help determine the overall stiffness and give rise to a higher FOM for the accelerometer structure. While the shims increase the stiffness of the structure, the displacement becomes very small. A small magnitude of displacement precludes or makes very difficult the design of mechanical stops. Thus, the above-noted invention allows one to use a shimmed beam to obtain an extreme increase in natural frequencies and an extreme increase in FOM while allowing for very small displacements to be accurately controlled.

Comparatively, the properties for a beam without shims and a shim beam for a 30 g accelerometer would be that the natural frequency of a beam without shims would be around 1700 Hz, while a shimmed beam will have a natural frequency of around 13,000 Hz, with the beam without shims having a FOM of about 1300 and with a shimmed beam having a FOM of over 21,000. The beam without shims having displacements of 100 micro-inches, with the shimmed beam having displacement of 1.7 micro-inches. Thus, by utilizing the above-noted stop mechanism, one can utilize shimmed beams and assure that the small displacement is accommodated for normal accelerations while any large acceleration which would otherwise rupture or break the beam is limited by the stop mechanism depicted and described above.

It is apparent to one skilled in the art that there are many alternate embodiments which may be envisioned, all of which are deemed to be encompassed within the spirit and scope of the claims appended hereto.

What is claimed is:

1. Apparatus for limiting the movement of an accelerometer, comprising:
   an accelerometer structure having a base and a seismic mass with a relatively thin beam positioned between the said mass and said base,
   said mass having a tapered end about an end surface furthest remote from said beam along a central axis of said accelerometer structure,
   a movement limit member positioned along said central axis of said accelerometer structure, said movement limit member having a tapered aperture positioned to surround said tapered end of said mass, and
   means coupled to said limit member to move said limit member with respect to said mass, along said central axis, to determine a limit of movement of said mass and therefore said beam during accelerometer operation.

2. The apparatus according to claim 1, further including:
   a hollow housing having an internal hollow for enclosing said mass and said beam, said housing having an opening for surrounding said base to enable said mass and said beam to be positioned in said housing, said limit member also positioned in said hollow with said aperture surrounding said tapered portion of said mass.

3. The apparatus according to claim 2, wherein said means coupled to said limit member includes a bolt, said limit member having an aperture, with a wall of said housing having a corresponding aperture with said bolt positioned within said housing wall and said limit member aperture and operative, when rotated, to alter a spacing between said tapered end of said mass and said taper of said limit member aperture to thereby limit the movement of said mass and therefore said beam.

4. The apparatus according to claim 1, wherein said beam has a shim containing stain gauges and operative to increase both the stiffness of said beam and a measure of performance referred to as a figure of merit.

5. The apparatus according to claim 1, wherein said base and mass are cylindrical with said beam having a rectangular cross-section with the left and right sides of said rectangle being at least 5 to 10 times smaller than the diameter of said mass.

6. The apparatus according to claim 1, wherein said limit member is fabricated from a material that is softer than the material of said mass.

7. The apparatus according to claim 4, wherein said strain gauges are piezoresistive sensors.

8. Apparatus for limiting the movement of a beam type measuring device, comprising:
   a beam having a base end and a mass end,
   a mass coupled to said mass end of said beam and operative to move upon application of a force to said beam, said mass having an end remote from said mass end coupled to said beam, said remote end being tapered with respect to a central axis between said beam and said mass;
   a limit member having an aperture surrounding said tapered end, said limit member aperture having an inner surface having a taper, with respect to said central axis, corresponding to said mass remote end; and
   means coupled to said limit member to move said member with respect to said mass to determine the limit of movement of said mass during a measurement operation.

9. The apparatus according to claim 8, wherein said beam type measurement device is an accelerometer.

10. The apparatus according to claim 8, wherein said mass is cylindrical, with said limit member having a conical aperture.

11. The apparatus according to claim 8, wherein said beam is a shimmed beam.

12. The apparatus according to claim 11, wherein said beam has a single shim.

13. The apparatus according to claim 11, wherein said beam has multiple shims.

14. The apparatus according to claim 11, wherein said shimmed beam has strain gauges positioned thereon.

15. The apparatus according to claim 14, wherein said gauges are piezoresistive sensors.

16. The apparatus according to claim 8, wherein said limit member is fabricated from a softer material than the material of said mass.

17. The apparatus according to claim 8, further including a housing having a closed top and an opened bottom, said opened bottom coupled about said base end with said beam, said mass and said limit member extending into said housing.

18. The apparatus according to claim 17, further including a bolt having a threaded shaft and a head end coupled to said shaft said closed top of said housing having a bolt accommodating aperture, with said limit member also having a bolt accommodating aperture, said threaded shaft of said bolt positioned in said aperture of said limit member and said closed top and operative when rotated to vary the limit of movement of said mass with respect to said housing.

19. The apparatus according to claim 17, further including having a threaded shaft and a head end, said mass having a bolt accommodating aperture at the end surface surrounding said taper, and said limit member having a bolt accommodating aperture corresponding to said mass bolt accommodating aperture, with said threaded shaft of said bolt positioned in said mass and limit member apertures, to vary the limit of movement of said beam according to the rotation of said bolt.

20. A method for limiting the movement of an accelerometer having a cylindrical base and a cylindrical mass with a beam of a rectangular cross-section coupled between said mass and said base, and a cylindrical housing enclosing said mass and said beam and coupled to said base at one end and closed at the other end, comprising the steps of:

placing a taper about a top end surface of said mass, said surface furthest remote from said beam along a central axis of said cylindrical housing;

surrounding said taper with a moveable member having an aperture with a corresponding taper to said mass taper; and moving said moveable member to change a spacing between said mass and said housing to thereby limit the movement of said mass during accelerometer operation.

* * * * *